United States Patent

Zweng

[11] 3,875,797
[45] Apr. 8, 1975

[54] METHOD AND APPARATUS FOR MEASURING FLOW-SPEED OF GASES

[75] Inventor: Josef Zweng, Warmbronn, Germany

[73] Assignee: Robert Bosch GmbH, Stuttgart, Germany

[22] Filed: Dec. 12, 1973

[21] Appl. No.: 426,630

[30] Foreign Application Priority Data
Jan. 27, 1973  Germany............................ 2304020

[52] U.S. Cl............................................... 73/194 R
[51] Int. Cl............................................... G01f 1/00
[58] Field of Search........ 73/194 R, 205 R; 137/804, 137/805

[56] References Cited
UNITED STATES PATENTS
3,678,746  7/1972  Corey................................. 73/194 R
3,705,534  12/1972  Turek............................ 73/194 R X

*Primary Examiner*—Jerry W. Myracle
*Attorney, Agent, or Firm*—Michael S. Striker

[57] ABSTRACT

A main stream of gas is advanced in the path, and an auxiliary stream of gas is directed across the path from one to an opposite side thereof where it impinges against a pair of separated apertures which are spaced from one another in the direction of elongation of the path. This creates differential pressures in the apertures since the auxiliary stream is deflected to some extent by the main stream and does not uniformly impinge upon both apertures. The differential pressures are measured and the auxiliary stream is moved longitudinally of the path until the pressures created in both of the apertures are identical. The extent to which the auxiliary stream has had to be moved in order to produce uniform pressure in both of the apertures is an indicator of the flow speed of the main stream.

4 Claims, 2 Drawing Figures

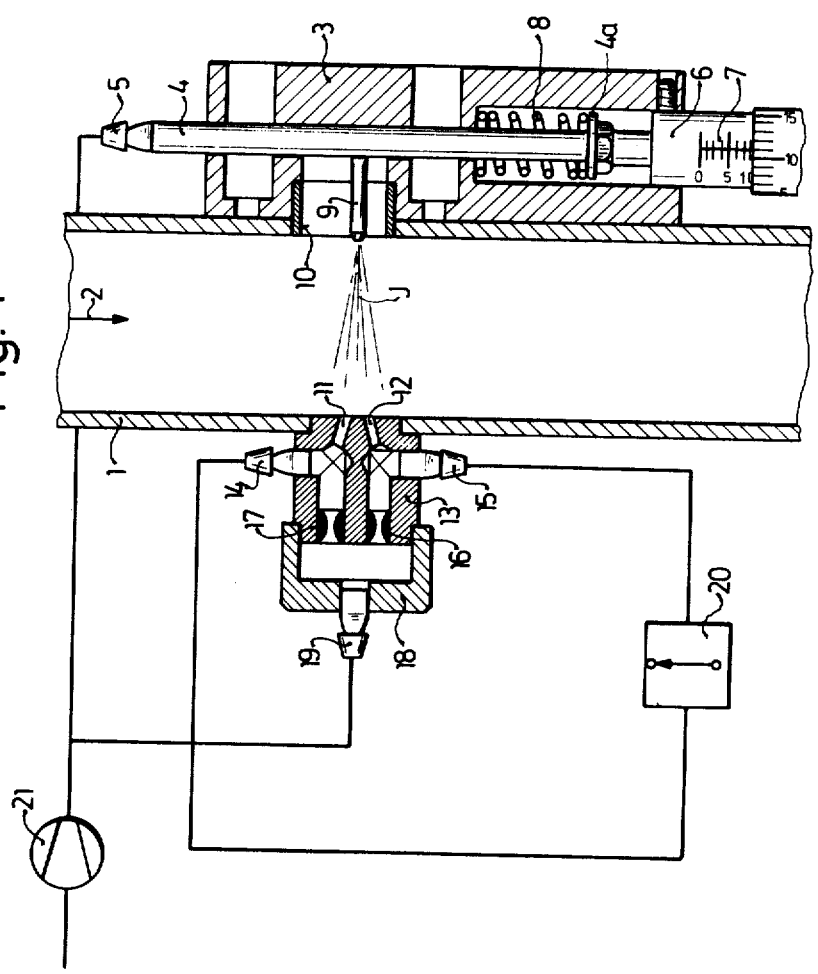

METHOD AND APPARATUS FOR MEASURING FLOW-SPEED OF GASES

BACKGROUND OF THE INVENTION

The present invention relates generally to the measuring of gas flow-speeds, and more particularly to a novel method of measuring the flow-speed of gases and to an apparatus for carrying out the method.

It is already known from the prior art to provide an arrangement for measuring the flow-speed of gases wherein a main gas stream whose flow speed is to be measured is advanced in a path, and wherein an auxiliary stream of gas is directed across the path and across the main stream from a fixed position adjacent one side of the path. At the opposite side of the path there are located two spaced apertures upon which the auxiliary stream impinges and which are both connected with a differential-pressure measuring device. The flow speed of the main stream deflects the auxiliary stream from its initial orientation, in the direction of flow of the main stream. This causes differential pressures to occur in the two apertures, since the auxiliary stream does not impinge the two apertures with equal pressure due to the deflection. The difference between these two pressures is a measure for the flow speed of the main gas stream.

However, this prior-art construction has serious disadvantages. In particular, the flow-speed measurements which can be taken are reliable only within a relatively narrow range of speed. As will be evident, if the speed of the gas stream to be measured exceeds a certain value, the auxiliary stream which passes across the main stream will be so strongly deflected that it will initially impinge only upon that aperture which is located downstream as seen with reference to the direction of flow of the main gas stream, and finally will be deflected even beyond this aperture so that it will impinge neither aperture. The result of this is, of course, that the differential-pressure measuring device will provide no usable indication at all, since the differential pressure between the two apertures will have disappeared and uniform pressure will exist in both of them as occasioned by the main gas stream.

SUMMARY OF THE INVENTION

It is, accordingly, a general object of the invention to overcome the disadvantages of the prior art.

More particularly, it is an object of the present invention to provide an improved method of measuring the flow-speed of gases, which method is not possessed of the aforementioned disadvantages.

An additional object of the invention is to provide such an improved method which permits reliable measurement of the flow-speed of gases over a wide range of speeds.

An additional object of the invention is to provide an improved apparatus for carrying out the method.

In keeping with the above objects, and with others which will become apparent hereafter, one feature of the invention resides in a method of measuring the flow-speed of gases, comprising the steps of advancing a main gas stream in a path, directing an auxiliary gas stream across the path from one to an opposite side thereof and against a pair of separated apertures which are spaced from one another longitudinally of the path. A differential pressure which develops in these apertures is measured, and the auxiliary gas stream is shifted longitudinally of the path and with reference to the apertures until the measured differential pressure becomes an equal pressure in both apertures. The magnitude of shifting required to reduce the pressure difference to zero is then employed as an indicator of the flow-speed of the main gas stream.

This invention has the advantage that the distance through which the nozzle from which the auxiliary gas stream issues, must be moved in order to obtain uniform pressure in both apertures, provides a ready indication of the flow-speed of the main gas stream.

It is possible that over a period of time the apertures may become clogged, for instance if the main gas stream should happen to be carrying particles which might become deposited in these apertures which latter, in order to provide a reliable indication, must not exceed a certain relatively small cross-sectional area. To avoid such clogging it is particularly advantageous if, according to a further concept of the invention, further gas streams are allowed to issue through these apertures which prevent the entry of particles into the latter. The resulting velocity head in the apertures is then measured to obtain the initial differential-pressure indications which must be brought to zero in the manner described above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic view illustrating an embodiment of the present invention; and FIG. 2 is a graph showing the result of tests carried out with the present invention as illustrated in FIG. 1.

DESCRIPTION OF THE PREFERRED EMBODIMENTS

Discussing firstly FIG. 1 it will be seen that reference numeral 1 identifies a conduit through which a stream of gas is advanced in the direction of the arrow 2. The flow-speed of the stream of gas is to be measured. For this purpose there is arranged at one side of the conduit 1 a support 3 formed with a bore in which a mounting tube 4 can be shifted longitudinally. A free end of the tube 4 projects beyond the support 3 and is provided with a connecting nipple 5 whereas the other end of the tube 4 is connected with a device 6 (shown only fragmentarily) which may for instance be constructed analogously to a micrometer screw* or the like, having a scale 7. Actuating the device 6 causes the tube 4 to be shifted axially of the bore in the support 3, and the extent to which the tube has been axially displaced can be directly read on the scale 7. It is important that there be no play allowed in this axial displacement of the tube 4, for which purpose a spring 8 is provided which abuts at one end against the support 3 and at the other end against a shoulder or disc 4a provided on the tube 4, thus preventing any play in the movement of the tube.

---
* a micrometer is shown on page 719 of American Machinists Handbook, McGraw Hill, New York, 1945 or on page 1031 of Machinery's Handbook, Industrial Press, New York, 1948.

The tube 4 is provided with a nozzle 9, which may be located substantially midway intermediate its ends and extends in the illustrated embodiment at right angle to the longitudinal axis of the tube 4. The outlet end of the nozzle 9 extends through an opening 10 and communicates with the interior of the conduit 1. A hose or conduit connected with the nipple 5 supplies an auxiliary gas stream to the nozzle 9 which issues from the same in form of a gas-stream of jet J. It is advantageous if the same gas is used for this purpose as the gas which flows in the conduit 1 in the direction of the arrow 2.

At the opposite side of the conduit 1, diametrally opposite to the nozzle 9, there are provided two receiver nozzles 11, 12 which in the illustrated embodiment are inclined at an acute angle relative to one another. The axes of the nozzles 11 and 12 are located in a common plane, that is on a line which extends longitudinally of the conduit 1 and which coincides with the line in which the nozzle 9 can move when the tube 4 is shifted in the manner described above. When the scale 7 is set at the zero indicator, the central axis of the nozzle 9 is located precisely midway between the two nozzles 11 and 12 which latter are provided in a mount 13 secured to the conduit 1. The mount 13 is provided with two outputs 14 and 15 which communicate with the nozzles 11 and 12, respectively. Each of the outputs 14 and 15 receives in the illustrated embodiment an auxiliary gas stream via a throttle 16 or 17, respectively which in turn receive the gas stream via a cover 18 in which a nipple 19 is provided. The latter is connected, as shown diagrammatically, with the diagrammatically illustrated source 21 of compressed gas, as is the nipple 5. The outputs 14 and 15 are each connected with a differential-pressure measuring device 20 which is not described in detail because it is known per se. *

* a measuring device of the type used here is, for instance, obtainable as differential pressure meter from Dwyer Instruments Inc., Michigan City.

In the operation of the device according to the present invention, a jet J of auxiliary gas issues from the nozzle 9 and passes across the conduit 1 and thus through a stream of gas whose flow-speed is to be measured and which travels in the direction of the arrow 2. The auxiliary jet J impinges upon the nozzles 11 and 12 and forms with the gas issuing from the latter respective velocity heads. The jet J is deflected in the direction of the arrow 2 by the main gas stream flowing through the conduit 1 and therefore tends to impinge to a greater extent upon the nozzle 12 which is located downstream, than upon the nozzle 11 which is located upstream with respect to the direction of movement indicated by the arrow 2. This means that a higher pressure will exist at the output 15 than at the output 14, and this differential is determined by the device 20. The operator now operates the device 6 to displace the tube 4 and the nozzle 9 counter to the direction of the arrow 2 until the pressure difference indicated by the device 9 has been reduced to zero, meaning that the pressure in the nozzle 11 and 12 is identical. The magnitude of this displacement can be read on the scale 7, and provides a measure for the flow-speed of the stream of gas flowing in the direction of the arrow 2.

It is of course possible to associate flow values directly with the magnitude of displacement of the nozzle 9. This is shown in the graph of FIG. 2 wherein the flow in liters per hour is indicated on the coordinate, and the displacement of the nozzle 9 is indicated in millimeters on the abscissa. Two curves A and B have been shown for which values have been empirically determined, being representative of two different jets issuing from the nozzle 9. The upper curve A was determined by having a jet with an outflow speed of 0.24 bar issue from the nozzle 9, and the lower curve B was determined by having a jet with an outflow speed of 0.06 bar issue from the nozzle 9.

It is clear that it is possible to omit the flow of gas from the nozzles 11 and 12, and to simply measure the pressures which will be obtained in the respective nozzles as they are impinged by the jet J. However, as pointed out earlier, this could lead to clogging of the nozzles because contaminant particles could then enter into and settle in the same. This is particularly true in certain circumstances, for instance if the flow of material in a particle conveyor system operating on the fluidizing principle is to be measured.

It will be appreciated that the axes of the nozzles 11 and 12 could be inclined at a different angle than that illustrated, or could extend in parallelism with one another. It will also be appreciated that the manner in which the nozzle 9 with the tube 4 is displaced longitudinally of the conduit 1 could be different from what has been illustrated, for instance by a turning movement or a combined turning and sliding movement, or even simply by blending the nozzle 9 in an appropriate manner.

It will be understood that each of the elements described above, or two or more together, may also find a useful application in other types of constructions differing from the types described above.

While the invention has been illustrated and described as embodied in the measuring of gas flow-speeds, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of measuring the flow-speed of gases, comprising the steps of advancing a main gas stream in a path; directing an auxiliary gas stream across said path from one to an oposite side thereof and against a pair of separated apertures which are spaced from one another longitudinally of said path; measuring a differential pressure which develops in said apertures; shifting said auxiliary gas stream longitudinally of said path and with reference to said apertures until the measured differential pressure becomes an equal pressure in both apertures; utilizing the magnitude of shifting as an indicator of the flow speed of said main gas stream; and directing secondary gas streams out of said apertures into said main gas stream.

2. In a device for measuring the flow-speed of gases, a combination comprising first means defining a flow path for a gas stream the flow speed of which is to be measured; second means forming two discrete passages at one side of said flow path, each passage having an aperture which communicates with said flow path and which are both located on a line extending longitudinally of the same; third means at an opposite side of said flow path and operative for directing an auxiliary gas stream across the same and at said apertures; fourth means for shifting said auxiliary gas stream longitudinally of said path and with reference to said apertures; differential-pressure measuring means connected with said passages for measuring the pressures therein; and means connecting said passages with a source of gas for ejecting streams of gas from said apertures into said path, so as to prevent clogging of said apertures by contaminants travelling in said flow path.

3. A combination as defined in claim 2; and further comprising throttling means interposed between the respective passage and said source.

4. A combination as defined in claim 2, wherein said source also supplies said gas stream for said flow path.

* * * * *